US011568362B2

(12) United States Patent
Muthuswamy et al.

(10) Patent No.: US 11,568,362 B2
(45) Date of Patent: Jan. 31, 2023

(54) SYSTEMS AND METHODS FOR VISUALIZING A TRADE LIFE CYCLE AND DETECTING DISCREPANCIES

(71) Applicant: International Business Machines Corporation, Armonk, NY (US)

(72) Inventors: Srinivasan S. Muthuswamy, Bangalore (IN); Subhendu Das, Chapel Hill, NC (US); Yashodhara M. Patnaik, Pune (IN); Ratul Sarkar, Bangalore (IN); Ankit Kumar Singh, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/361,506

(22) Filed: Jun. 29, 2021

(65) Prior Publication Data

US 2021/0326802 A1    Oct. 21, 2021

Related U.S. Application Data

(63) Continuation-in-part of application No. 16/238,206, filed on Jan. 2, 2019, now abandoned.

(51) Int. Cl.
*G06Q 10/08*    (2012.01)
(52) U.S. Cl.
CPC .................. *G06Q 10/087* (2013.01)
(58) Field of Classification Search
CPC ................................. G06Q 10/087
See application file for complete search history.

(56) References Cited

U.S. PATENT DOCUMENTS 5,038,284 A    8/1991    Kramer
8,655,758 B2    2/2014    Dweck et al.
(Continued)

FOREIGN PATENT DOCUMENTS

CN    111984742 A  *  11/2020
WO    2017024014 A1    2/2017

OTHER PUBLICATIONS

"Endler, Intrusion Detection Applying Machine Learning to Solaris Audit Data, Aug. 6, 2002, IEEE, entire document" (Year: 2002).*
(Continued)

*Primary Examiner* — Hani M Kazimi
*Assistant Examiner* — Adam Hilmantel
(74) *Attorney, Agent, or Firm* — Troutman Pepper Hamilton Sanders LLP

(57) ABSTRACT

A system and associated method provides a visualization of a life cycle of a trade order. The visualization may be in the form of a tree structure with a plurality of linked nodes. Each node may be associated with an event that occurs during the life cycle of the trade. A monitoring system receives information associated with a plurality of events associated with the trade order, generates a plurality of nodes based on the received information, stores identifiers associated with each of the plurality of nodes, and links the plurality of nodes based on the identifiers to create the tree structure. The monitoring system also performs a verification process to determine whether the visualization is missing information or includes incorrect information and alerts to a discrepancy identified during the verification process.

18 Claims, 11 Drawing Sheets

(56) References Cited

U.S. PATENT DOCUMENTS

| | | | |
|---|---|---|---|
| 2002/0087454 A1 | 7/2002 | Calo et al. | |
| 2003/0050879 A1* | 3/2003 | Rosen ................... | G06Q 40/02 |
| | | | 705/37 |
| 2004/0093298 A1 | 5/2004 | McClure, III et al. | |
| 2007/0088658 A1 | 4/2007 | Rosenthal et al. | |
| 2009/0112775 A1 | 4/2009 | Chiulli et al. | |
| 2010/0218047 A1* | 8/2010 | Woerz ................... | B60W 50/04 |
| | | | 714/E11.029 |
| 2017/0039644 A1* | 2/2017 | Palmer ................... | G06Q 40/04 |
| 2018/0322576 A1* | 11/2018 | Neumann .............. | G06Q 40/04 |

OTHER PUBLICATIONS

FIS. (n.d.). Consolidated Audit Trail: Solving the Biggest Data Challenge in Capital Markets. Retrieved from the Internet: URL: https://www.fisglobal.com/solutions/institutional-and-wholesale/broker-dealer/consolidated-audit-trail [retrieved on Jan. 2, 2019].

"What Are Cognitive Systems?", Apr. 22, 2019, Edupedia, whole document (Year: 2019).

* cited by examiner

SYSTEMS AND METHODS FOR VISUALIZING A TRADE LIFE CYCLE AND DETECTING DISCREPANCIES

CROSS REFERENCE TO RELATED APPLICATIONS

This application is a continuation in part application of U.S. patent application Ser. No. 16/238,206, filed on Jan. 2, 2019, which is incorporated herein by reference in its entirety.

TECHNICAL FIELD

The present application relates generally to tracking the steps that occur during a trade life cycle and, more particularly, to visualizing a trade life cycle in a tree structure and using the visualization to detect discrepancies in the trade life cycle.

BACKGROUND

A single trade order may involve thousands of events that occur in order to fulfill the order. These events make up the trade "life cycle" and include occurrences such as individual systems moving a request within their own system infrastructure to complete a task, such as risk analysis, fraud check, etc., messages being sent between different systems to facilitate some aspect of the order, splitting of an order into child orders of smaller quantities in order to complete the overall order more effectively, and the like. There are compelling reasons, including for regulatory reporting purposes, to completely track every aspect of a trade order and document everything that happens between trade order request and fulfillment (or modification or cancellation).

For example, the recent Rule 613 under the National Market System requires regulatory reporting of every event that occurs with respect to a trade order. While order management systems collect this information today, there is a lack of useful tools that enable monitoring of the trade life cycle events for reporting under Rule 613. Moreover, there is a need to verify and validate the information that has been collected because any discrepancies will be flagged by the regulatory agency and re-reporting with an explanation for the discrepancy will be required. Thus, there is a need to visualize the trade life cycle for a given trade order and perform a verification to ensure that the visualization is accurate and complete.

The present disclosure is directed to overcoming these and other problems of the prior art.

SUMMARY

In some embodiments, a method includes receiving information associated with a plurality of events associated with the trade order, generating a plurality of nodes based on the received information and storing identifiers associated with each of the plurality of nodes, linking the plurality of nodes based on the identifiers to create a tree structure as the visualization of the trade order life cycle, performing a verification process to determine whether the visualization is missing information or includes incorrect information, and alerting to a discrepancy identified during the verification process.

In another embodiment, a monitoring system includes a processing device configured to execute stored instructions to create a visualization of the trade order life cycle, the visualization including a plurality of nodes created based on events associated with the trade order, the plurality of nodes including identifiers associated therewith, and a plurality of linkages determined based on the identifiers, the linkages creating a tree structure of the visualization. The monitoring system is also configured to perform a verification process to determine whether the visualization is missing information or includes incorrect information, and modify the tree structure to indicate the missing information or incorrect information as a discrepancy at a node associated with the discrepancy.

In another embodiment, a method includes calculating a plurality of order amounts at a plurality of nodes of a tree structure of the visualization, starting at a leaf node and back-propagating to an initial order node, comparing the plurality of order amounts to each other before progressing to a previous node in the back-propagation, and alerting to a discrepancy identified when the plurality of order amounts do not match, the discrepancy being associated with a node at which the plurality of order amounts do not match.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF EXEMPLARY EMBODIMENTS

Figure 1:
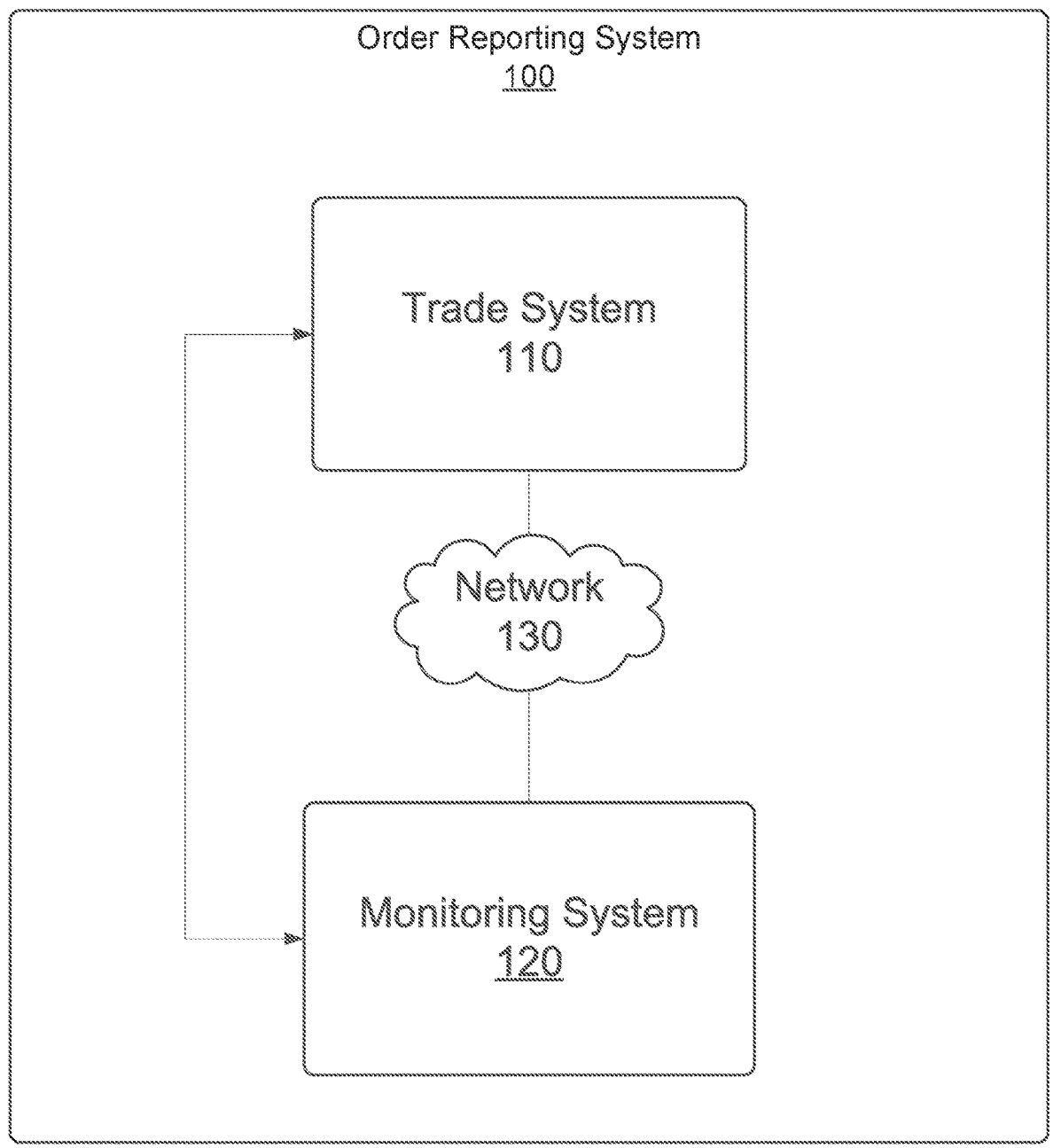
FIG. 1 depicts a schematic diagram of an order reporting system.

Embodiments of the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a head disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network (LAN), a wide area network (WAN) and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including LAN or WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operations steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical functions. In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present disclosure relates to a system for creating a visualization of an order life cycle. The system may model each event that occurs during the life cycle of the order as a node with information associated with the event. Examples of events include order creation, order split, order messaging within the same system, order messaging across different systems, etc. The system may further construct a tree structure by linking the events. For example, a parent order may be split into two child orders, with these three events being linked as a split. The visualized tree structure thereby may represent the entire order from initial order request to fulfillment. Together the visualized system may be considered a consolidated audit trail for regulatory reporting purposes.

The system captures the basic features of an order such as ticker, price, quantity, direction (e.g., buy or sell), updates, cancelations, acknowledgments, and generates nodes for the tree structure. Each node may include information about the overall order, the individual event, and/or additional relevant information. The system may perform a verification analysis to identify any discrepancies that indicate that the consolidated audit trail is incomplete. For example, the system may back-propagate an analysis of the quantities associated with each event to check that the final fulfilled order is explained by the events that occur after the initial order request.

FIG. 1 is an illustration of an exemplary order reporting system 100. The order reporting system 100 includes components that allow for completion and monitoring of a trade order. The order reporting system 100 may include a trade system 110 and a monitoring system 120 connected by a network 130.

The trade system 110 may be configured to facilitate a trade order, such as an investment order through a stock market. Various financial institutions, including brokerage firms, create and complete trade orders in order to perform their core investment functions. There is a need, including for regulatory reporting, to track all of the events that occur with respect to a trade order and produce a consolidated audit trail for the trade order. The trade system 110 is one example of a system of interconnected components that are configured to complete a trade order. The trade system 110 may be a computing system or, more particularly, a network of interconnected computing systems. For example, the trade system 110 may include a plurality of systems that work together to complete a trade order from request to fulfillment.

The monitoring system 120 is connected to the trade system 110 and is configured to collect data about events that occur within the trade system 110. The monitoring system 120 may be a computing system and/or program that resides on one or more systems within the trade system 110. The monitoring system 120 is configured to perform monitoring tasks, including modeling, construction, and verification of trade orders and constituent events in order to visualize a trade order and detect discrepancies.

The network 130 may be a local or global network and may include wired and/or wireless components and functionality which enable communication between the trade system 110 and the monitoring system 120. The network 130 may be embodied by the Internet, provided at least in part via cloud services, and/or may include one or more communication devices or systems which enable data transfer to and from the systems and components of the trade system 110 and the monitoring system 120.

In accordance with some exemplary embodiments, the trade system 110, monitoring system 120, or the related components include logic implemented in specialized hardware, software executed on hardware, or any combination of specialized hardware and software executed on hardware, for implementing the order reporting system 100 or related components. In some exemplary embodiments, the order reporting system 100 or any of its components may be or include the IBM Watson™ system available from International Business Machines Corporation of Armonk, N.Y., which is augmented with the mechanisms of the illustrative embodiments described hereafter.

Figure 2:
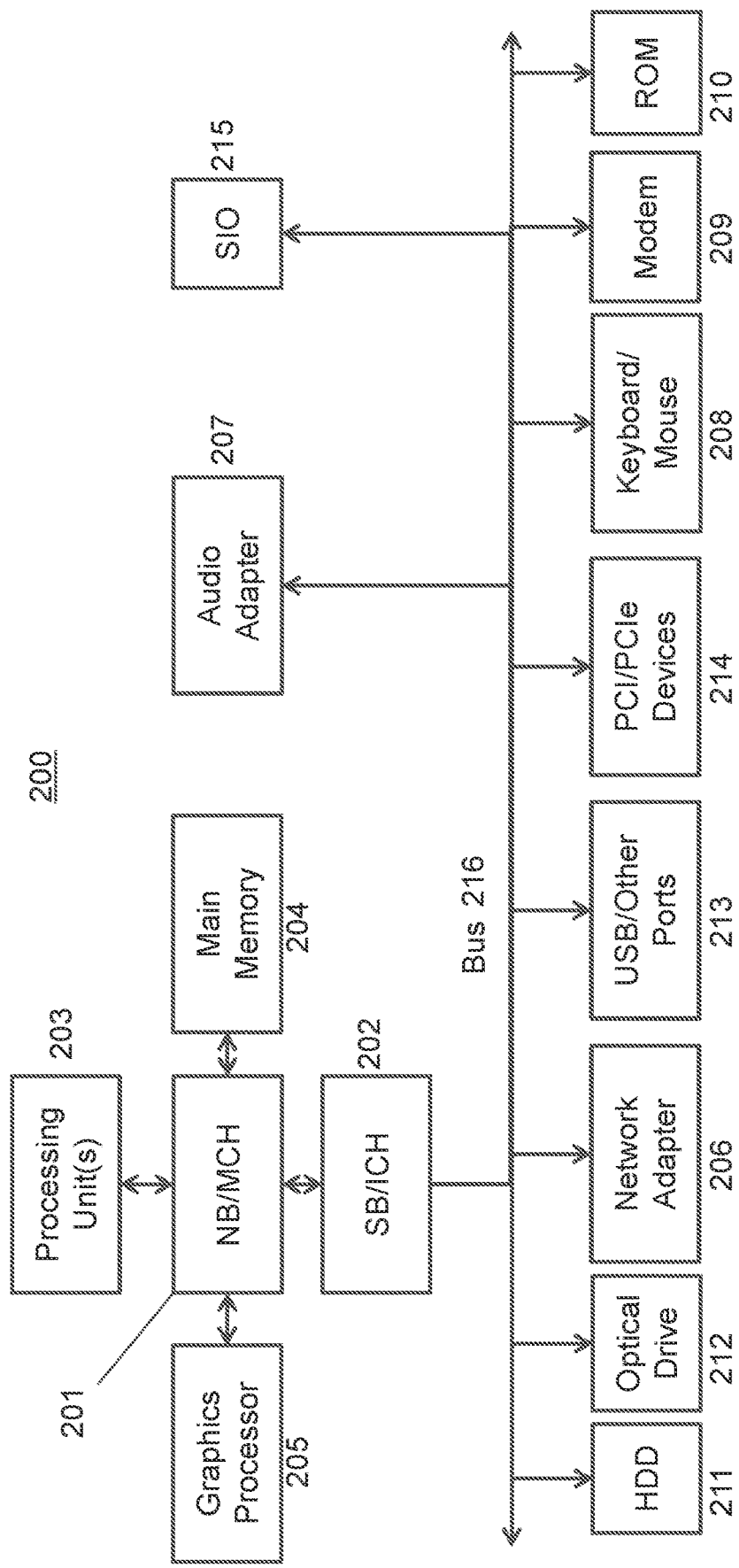
FIG. 2 is a block diagram of an example data processing system in which aspects of the illustrative embodiments are implemented.

FIG. 2 is a block diagram of an example data processing system 200 in which aspects of the illustrative embodiments are implemented. Data processing system 200 is an example of a computer in which computer usable code or instructions implementing the process for illustrative embodiments of the present invention are located. In one embodiment, FIG. 2 represents the monitoring system 120, which implements at least some of the aspects of the order reporting system 100 described herein.

In the depicted example, data processing system 200 can employ a hub architecture including a north bridge and memory controller hub (NB/MCH) 201 and south bridge and input/output (I/O) controller hub (SB/ICH) 202. Processing unit 203, main memory 204, and graphics processor 205 can be connected to the NB/MCH 201. Graphics processor 205 can be connected to the NB/MCH 201 through an accelerated graphics port (AGP).

In the depicted example, the network adapter 206 connects to the SB/ICH 202. The audio adapter 207, keyboard and mouse adapter 208, modem 209, read only memory (ROM) 210, hard disk drive (HDD) 211, optical drive (CD or DVD) 212, universal serial bus (USB) ports and other communication ports 213, and the PCI/PCIe devices 214 can connect to the SB/ICH 202 through bus system 216. PCI/PCIe devices 214 may include Ethernet adapters, add-in cards, and PC cards for notebook computers. ROM 210 may be, for example, a flash basic input/output system (BIOS). The HDD 211 and optical drive 212 can use an integrated drive electronics (IDE) or serial advanced technology attachment (SATA) interface. The super I/O (SIO) device 215 can be connected to the SB/ICH 202.

An operating system can run on processing unit 203. The operating system can coordinate and provide control of various components within the data processing system 200. As a client, the operating system can be a commercially available operating system. An object-oriented programming system, such as the Java programming system, may run in conjunction with the operating system and provide calls to the operating system from the object-oriented programs or applications executing on the data processing system 200. As a server, the data processing system 200 can be an IBM® eServer™ System p® running the Advanced Interactive Executive operating system or the Linux operating system. The data processing system 200 can be a symmetric multiprocessor (SMP) system that can include a plurality of processors in the processing unit 203. Alternatively, a single processor system may be employed.

Instructions for the operating system, the object-oriented programming system, and applications or programs are located on storage devices, such as the HDD 211, and are loaded into the main memory 204 for execution by the processing unit 203. The processes for embodiments of the website navigation system can be performed by the processing unit 203 using computer usable program code, which can be located in a memory such as, for example, main memory 204, ROM 210, or in one or more peripheral devices.

A bus system 216 can be comprised of one or more busses. The bus system 216 can be implemented using any type of communication fabric or architecture that can provide for a transfer of data between different components or devices attached to the fabric or architecture. A communication unit such as the modem 209 or network adapter 206 can include one or more devices that can be used to transmit and receive data.

Those of ordinary skill in the art will appreciate that the hardware depicted in FIG. 2 may vary depending on the implementation. For example, the data processing system 200 includes several components which would not be directly included in some embodiments of the order reporting system 100. However, it should be understood that an order reporting system 100 may include one or more of the components and configurations of the data processing system 200 for performing processing methods and steps in accordance with the disclosed embodiments.

Moreover, other internal hardware or peripheral devices, such as flash memory, equivalent non-volatile memory, or optical disk drives may be used in addition to or in place of the hardware depicted. Moreover, the data processing system 200 can take the form of any of a number of different data processing systems, including but not limited to, client computing devices, server computing devices, tablet computers, laptop computers, telephone or other communication devices, personal digital assistants, and the like. Essentially, data processing system 200 can be any known or later developed data processing system without architectural limitation.

Figure 3:
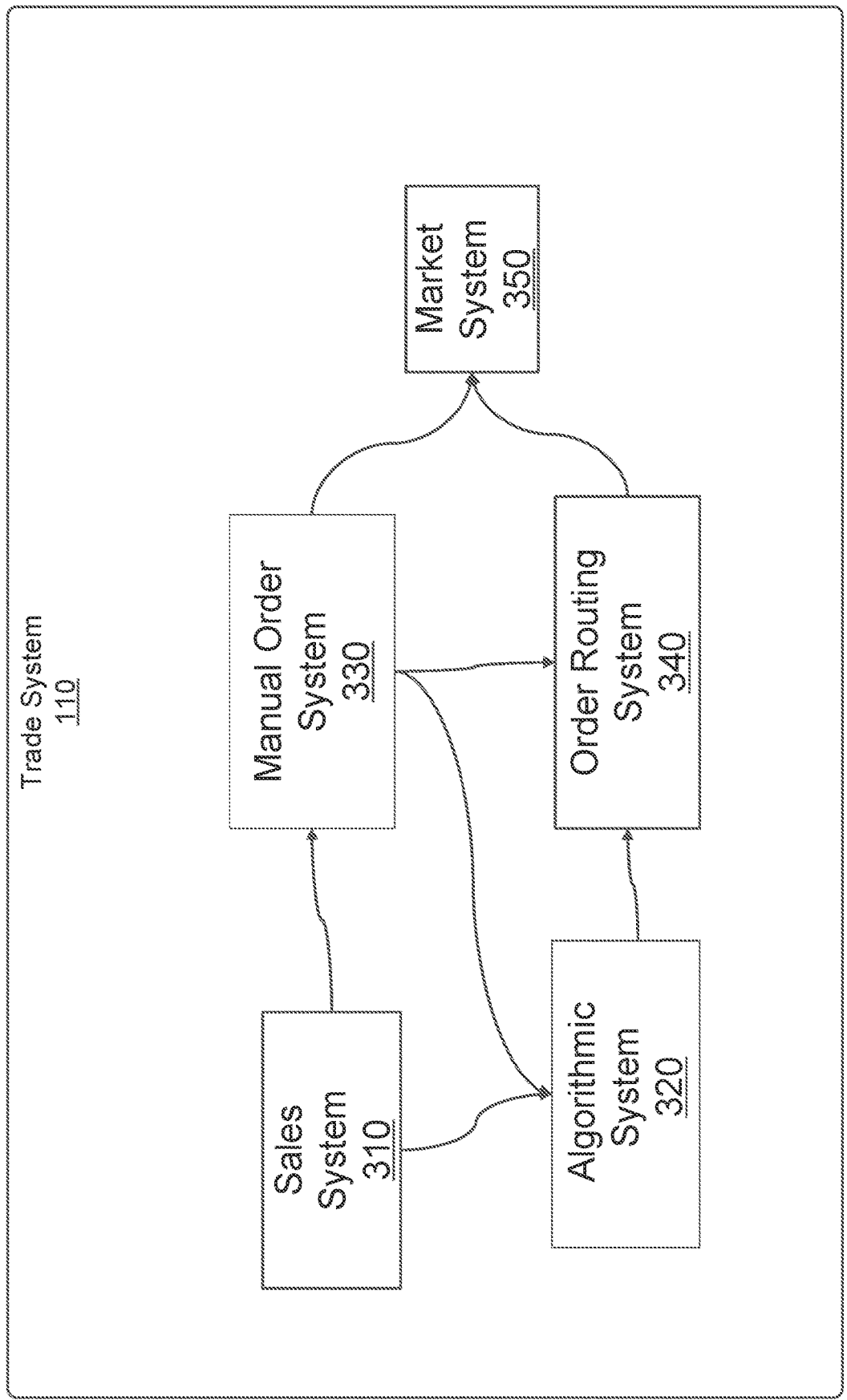
FIG. 3 further depicts details of a trade system that may be implemented in the order reporting system.

FIG. 3 further illustrates an exemplary embodiment of the trade system 110. The trade system 110 may include, for example, a sales system 310, an algorithmic system 320, a manual order system 330, an order routing system 340, and a market system 350. Two or more of these systems may work together to complete a trade order. For example, the sales system 310 may receive a trade order request and send it to the algorithmic system 320 for risk analysis. The sales system 310 may also deliver the trade order request to the manual order system 330 for manual review and an order routing system 340 for executing one or more associated trades. The manual order system 330 and/or the order routing system 340 may communicate with the market system 350 to fulfill one or more trades associated with the overall trade order.

The systems 310-350 of the trade system 110 perform relevant tasks in order to fulfill a trade order. The monitoring system 120 may receive information related to these tasks and generate a visualization of the trade order during and/or after the order completion process. For example, the monitoring system 120 may collect quantity information at each step of the process in order to track how one or more individual trades make up an overall trade order.

Figure 4:
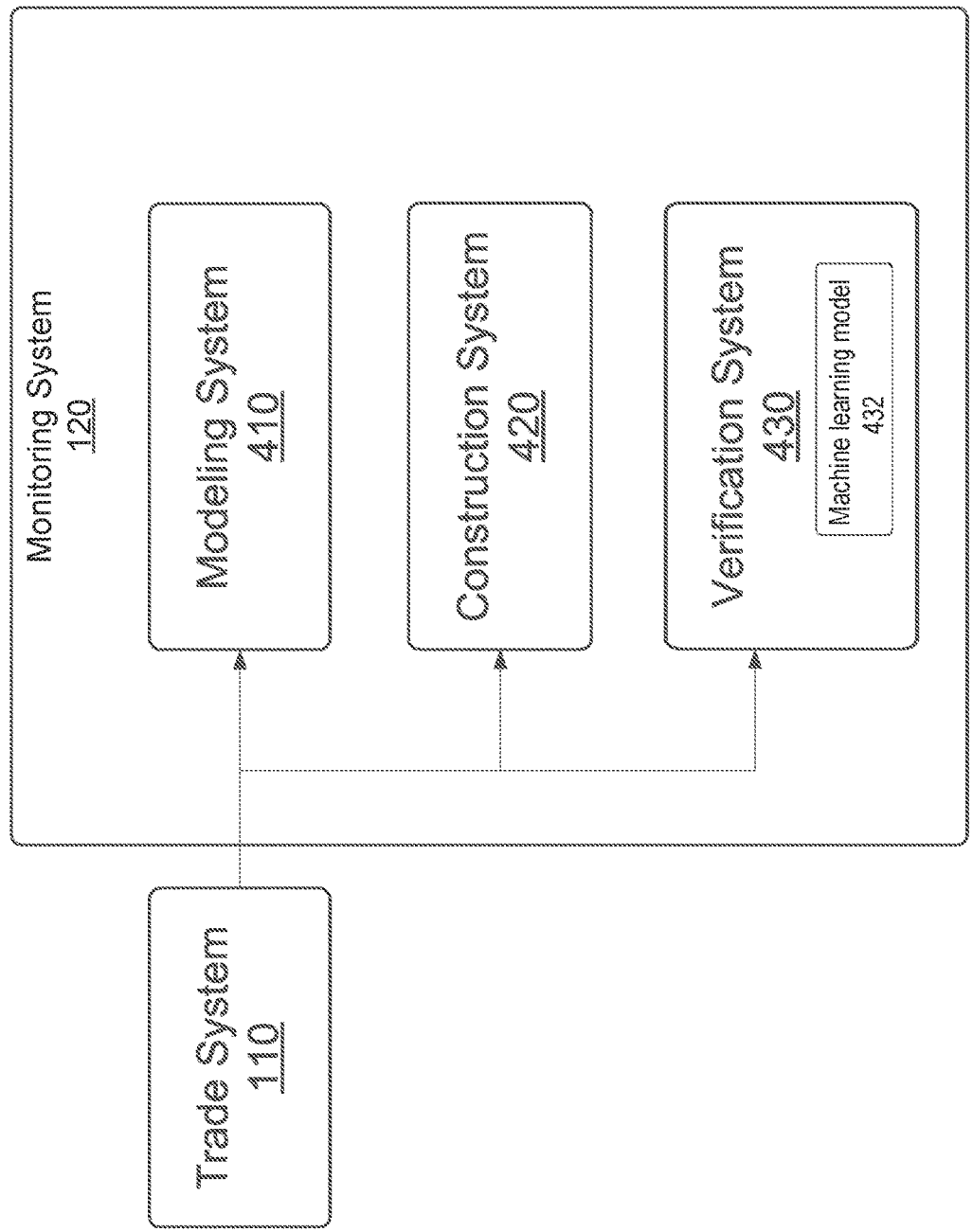
FIG. 4 further depicts details of an exemplary monitoring system that may be implemented in the order reporting system.

FIG. 4 further illustrates an exemplary embodiment of the monitoring system 120. As shown, the monitoring system 120 may include, for example, a modeling system 410, a construction system 420, and a verification system 430. The modeling system 410 may collect information from the trade system 110 and identify events that are associated with a trade order. In one embodiment, the trade order may be an investment transaction that progresses from "Buy X amount of Shares of Y at Price Z for Customer C" until Customer C is owner of X amount of Shares of Y. In other embodiments, the trade order may be part of a more complicated transaction, involving ranges for amount, stock, and/or price, and/or multiple customers buys compiled into a single trade order. The disclosed embodiments are not limited to any particular type of trade order and can be adapted depending on the circumstances. The modeling system 410 may be a part of an order management system that compiles and centralizes information associated with a trade order. The modeling system 410 may parse information (e.g., from a spreadsheet, database, etc.) to generate and classify events associated with a trade order. Classification of each event may include tagging based on identifier to identify the type of event that has occurred. The modeling system 410 may create "nodes" based on the identified events. The modeling system 410 may perform functions in real-time or well after a trade order has been fulfilled.

In an exemplary embodiment, the modeling system 410 may receive information from multiple systems 310-350 associated with various events that occur within the systems. The information may be associated with messages that are sent within and between the systems 310-350 and may include columns of information associated with the event (e.g., order ID, price, currency, quantity, market, last price, last quantity, message type, sender ID, receiver ID, sending time, reference ID, split linkage, etc.). These columns of information may be stored and/or categorized by the modeling system 410 as identifiers associated with each node that is created based on the identified events.

The construction system 420 may review the information (e.g., identifiers) associated with each event identified as part of the same overall trade order and create linkages between events. These linkages may create a tree structure that is a visualization of the trade order. For example, the construction system 420 may match classifications and timing between events to create a link. For instance, the construction system 420 may review information collected from the manual order system 330 indicating that an order quantity has been split into two child orders and create a branch structure between the associated nodes. Different nodes may be linked as messages being sent within or across systems. For example, one node may be the creation of a trade order in the sales system 310 and a second node may be the receipt of the trade order in the manual order system 330. The resulting tree structure is a visualization of the trade order, including linked nodes that represent the progression of a trade order from initial request to fulfillment, accounting for any cancellation and/or modification that may occur during the process.

The verification system 430 may inspect the constructed tree structure, including nodes and linkages, and identify any discrepancies that may be present. A discrepancy may be an indication that information is missing and thus the visualization of the trade order is incorrect and/or incomplete. For example, a trade order may include a quantity split into child orders. If information associated with one of the child orders is not present in the source material reviewed by the modeling system 410, an "orphan" may be created, causing a lack of accounting for a portion of the overall order within the constructed visualization. The verification system 430 may perform verification steps to determine whether a discrepancy is present. In an exemplary embodiment, the verification steps may include back-propagating a quantity calculation from the end of the tree structure backwards to the beginning of the order. The verification system 430 also includes a machine learning model 432, which can determine the identified discrepancies are valid (i.e., real) errors or false positives.

Discrepancies may exist within a tree structure for a variety of reasons. In one example, an orphan order leads to missing and/or incorrect information within the data set associated with an entire trade order. In another example, an order may be canceled but the order itself is fulfilled so a cancelation shows up in the data that does not reflect the actual events that occurred (e.g., the order was actually fulfilled despite the cancelation). In another example, a split may cause a discrepancy. For example, different order sizes and order prices may be attempted for the same order, and once the best price is achieved, all of the other child orders are canceled. This may especially occur in the algorithm system 320. In another example, if any malfunction of a system function, timing, etc. occurs, the data associated with an order may not match throughout all of the systems.

Figure 5:
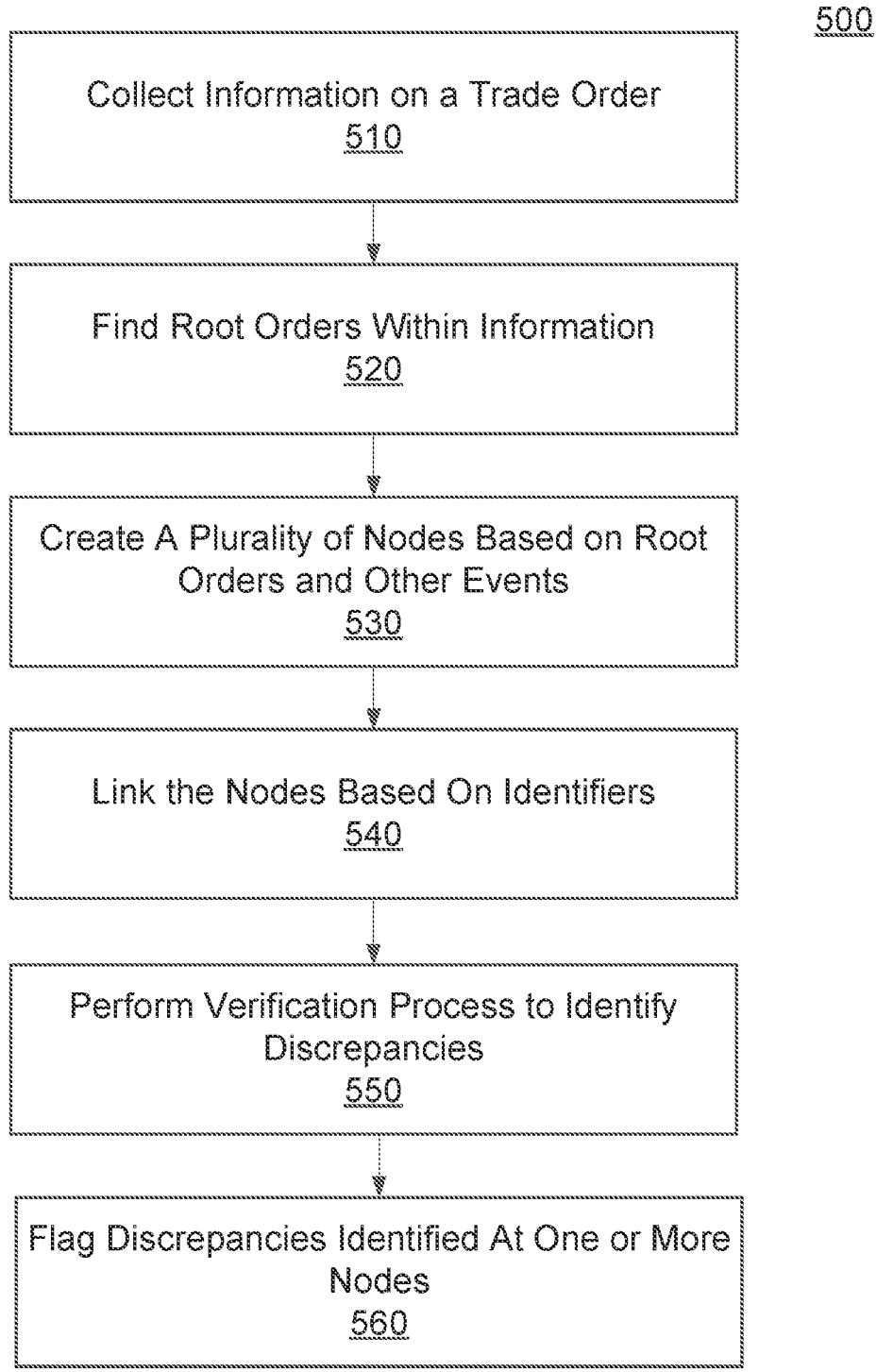
FIG. 5 is a flowchart of an exemplary order monitoring process, consistent with disclosed embodiments.

FIG. 5 is a flowchart of an exemplary process 500 for monitoring a trade order that is processed through the trade system 110. The monitoring system 120 may track the order as it progresses and compile information in order to create a consolidated audit trail for regulatory reporting. The monitoring system 120 may communicate with each system 310-350 within the trade system 110, or may collect source information from another location, such as an order management system.

In step 510, the monitoring system 120 collects information on a trade order. This may include the monitoring system 120 gathering information from an order management system (e.g., in FIX, CSV, or other formats). The information may be associated with a specific order or may be a combination of multiple orders. The monitoring system 120 (e.g., through the modeling system 410) may classify information as associated with a particular trade order. The modeling system 410 may partition and/or group events by ticker (as used herein, "ticker" may refer to the other stock, commodity, product, etc. that is the subject of the trade order) in order to maintain separate orders. The modeling system 410 may also gather classification information associated with each step in the trade order process (e.g., amount, price, quantity, ticker, etc.).

In step 520, the monitoring system 120 may find root orders within the information identified as part of an overall trade order. The root orders may be the original orders that are entered into or received by the trade system 110 or its subsystems (e.g., initial orders). For example, if a customer inputs an order into the sales system 310, that order will not have a parent order and it will be treated as a root order. That order may be sent to the algorithm system 320, where it may be split into any number of child orders. The receipt of the order at the algorithm system 320, before it is split, may also be a root order as it is the only order in the algorithm system 320 that has reference to the parent order (from the sales system 310). Every other order in the algorithm system 320 will have parent orders within the algorithm system 320, and thus would not be a root order. In the entire trade, an order with no parent is identified as an initial order. If an order is modified, the modification is linked to the initial order as a parent-child and thus the modification does not qualify as a root order.

In step 530, the monitoring system 120 may create a plurality of nodes based on the root orders identified in step 520 and any modifications, cancelations, or child orders. These nodes may be representations of an event that occurs during the life cycle of a trade order. Each node may be classified with identifiers that identify the system, status, and type of event. For example, the node may include an identifier that indicates the system on which the event occurred, the type of event (e.g., receipt of an order, delivery of an order, modification of an order, etc.), and the status (e.g., completed, not completed, missing information, etc.). The modeling system 410 may compile the nodes and add them to a visualization space, such as by executing software instructions that produce a visualization that may be displayed to a user.

In step 540, the monitoring system 120 links the nodes based on identifiers. For example, the construction system 420 may use the identifying information to determine how each node should be linked to represent the life cycle of the trade order. Each linkage may be classified based on the type of connection or relation between the nodes. For example, a link may be generated based on the order moving from one system to the next, a link to child orders from a split parent order, a link to a canceled order message or instruction, a link to an order modification message or instruction, or a link to a fulfilled order. The construction system 420 may compile the links in the visualization space in order to present the visualization of the entire trade order to a user as a connected tree structure.

As described in steps 530 and 540, a graph data structure (i.e., a tree structure) is applied to store and retrieve the information, such as events that occur during the life cycle of a trade order and related information (e.g., the system on which the events occurred, types of events and the statuses, etc.). A graph data structure is a non-linear data structure consisting of nodes (also referred to as vertices) and links (also referred to as edges, linkages, or lines). The links are lines or arcs that connect any two nodes in the graph data structure.

Each order can be presented in a graph view or a network view, which can illustrate how the original order is passed through multiple subsystems of the trade system 110, how the original order is split into multiple child orders, and amendments or cancelations on the original order or its child orders.

In step 550, the monitoring system 120 performs a verification process to verify that the completed visualization does not have any discrepancies that would indicate that the tree structure has missing or incorrect information. The verification process may include calculating a plurality of values across the tree structure to determine whether the amounts "add-up" based on an accounting of each event. In one embodiment, the verification system 430 performs an analysis that includes the calculation of order amounts at each node within the tree structure. The verification system 430 may compare calculated order amounts in order to determine whether there is a discrepancy within the visualization.

In step 560, the monitoring system 120 may flag any nodes within the tree structure that are indicating a discrepancy. For example, the verification system 430 may produce an alert that identifies a node that is flagged based on the order amount comparison. The alert/flag may be added to the visualization that is displayed to the user, thereby indicating to the user the presence of a discrepancy in the visualization of the life cycle of a trade order. For example, nodes that are flagged as including a discrepancy may be colored red, while nodes where no discrepancy is found may be colored green. The user may then review the data to determine the source of the discrepancy and provide additional information to the monitoring system 120 in order to correct the issue and complete the visualization for reporting. In an embodiment, a user clicks on one or more nodes that are flagged as including a discrepancy, and the user interface can display the expected fulfilled order size versus the actual fulfilled order size, and highlight missing executions associated with the one or more nodes. A tree structure organized in a graph data structure is shown on the user interface, with one or more nodes including a discrepancy flagged.

Figure 6:
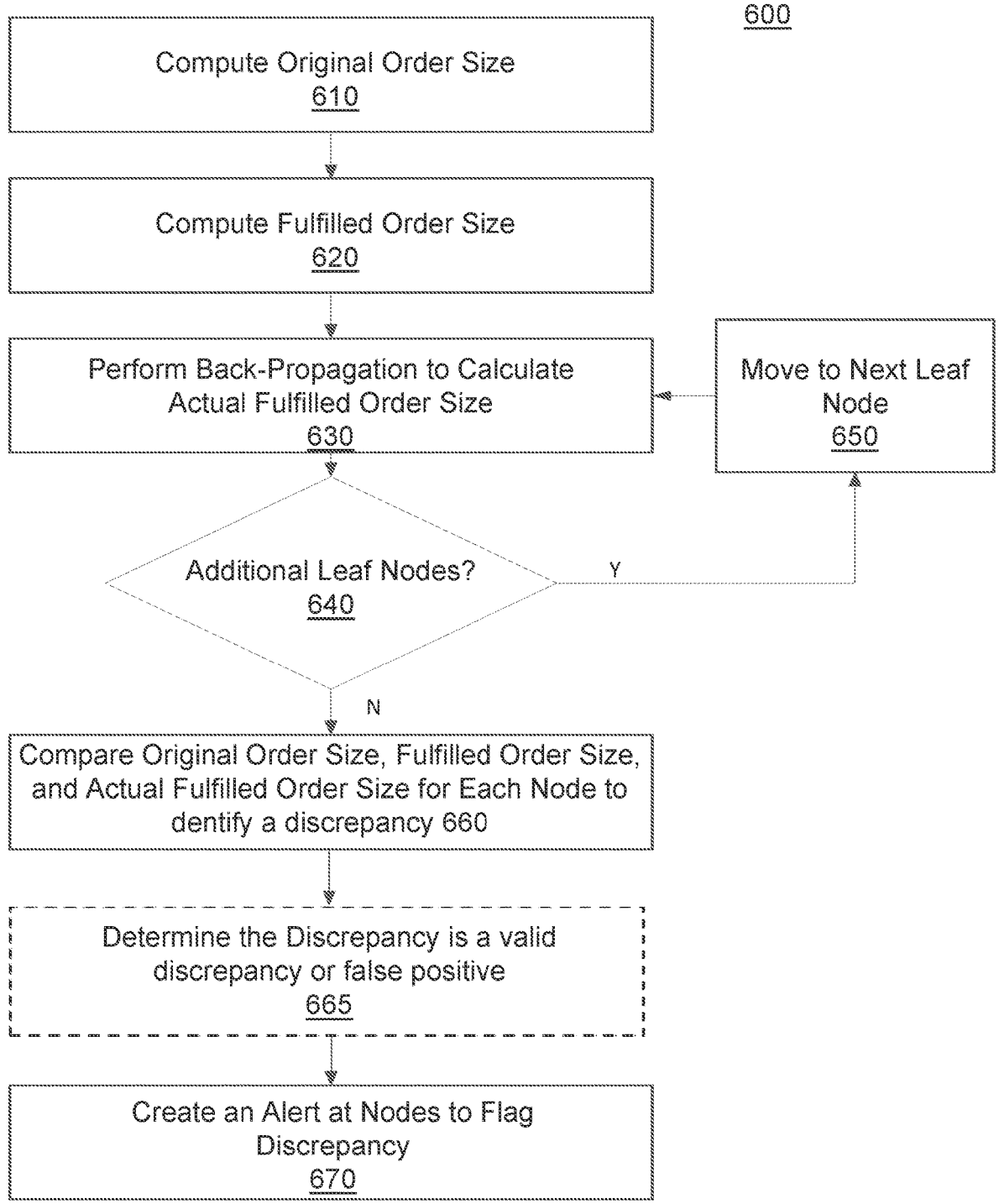
FIG. 6 is a flowchart of a verification process, consistent with disclosed embodiments.

FIG. 6 is a flowchart of an exemplary verification process 600 for identifying discrepancies within a visualized trade order life cycle. Verification system 430 may perform process 600 as part of step 550 of process 500, for example. The verification system 430 may use information gathered in process 500 to identify nodes within the trade order that are missing information or are causing the visualization to present incorrect information. In the process 600, the verification system 430 may calculate a plurality of order amounts for each node within the tree structure. These order amounts may include, in one embodiment, three different values—(1) the original order size, (2) the fulfilled order size, and (3) the actual fulfilled order size.

In step 610, the monitoring system 120 may compute the original order size for each node. The original order size may be identified as the order amount (e.g., number of shares, total price, etc.) that was initially requested, modified by any offset amount according to an order modification or order cancellation instruction. For example, the original order size may be 1000 shares of Y Stock. If the order was modified to cancel 500 shares, the original order size would be 500. If the entire order was cancelled, the original order size would be 0. The verification system 430 may, in one embodiment, calculate the original order based on the original nodes and any cancellation or modification nodes found in the tree structure and apply the original order size to each of the nodes in the tree structure.

In step 620, the monitoring system 120 may compute the fulfilled order size. The fulfilled order size may be the total amount (e.g., number of shares, total price, etc.) equal to the sum of all execution reports for a given trade order. The fulfilled order size thus represents the amount that we would have expected to be fulfilled for the trade order based on the data (i.e., execution reports) that is received in association with the trade order. The verification system 430 may calculate the fulfilled order size based on the execution reports and apply the fulfilled order size to each of the nodes in the trade order.

In step 630, the monitoring system 120 may perform back-propagation to calculate the actual fulfilled order size. The actual fulfilled order size may be the order size that is actually fulfilled at the trade level. For example, the actual fulfilled order size may be the sum of the acknowledged trades from the market trade system 350. The verification system 430 may iteratively calculate the actual fulfilled order size by starting with a leaf node and tracing back to an initial order node. In some embodiments, a leaf node may be any node that does not have a subsequently-linked node (e.g., an end of a chain). In one example, a leaf node may be a node that represents an event in which an order is sent to the market (e.g., market system 350). The leaf nodes may include acknowledgment data that indicates an amount that is actually fulfilled. The verification system 430 may identify the acknowledged amount and back-propagate to apply that amount to each previously linked node.

In step 640, the monitoring system 120 may determine whether there are additional leaf nodes. There will be multiple leaf nodes in an order that includes any nodes that are split into multiple child orders. The child orders will eventually end as a leaf node. If there are additional leaf nodes, the process 600 will move to the next leaf node in step 650. The verification system 430 will repeat step 630 to calculate an actual fulfilled order size and back-propagate that amount to each previously linked node. The verification system 430 will keep track and sum actual fulfilled order sizes at any parent node that is split and leads to multiple leaf nodes.

After the last leaf node is considered, the process 600 will move to step 660 and compare the original order size, fulfilled order size, and actual fulfilled order size for each node in the tree structure. For example, the verification system 430 may compare the three order amount values to determine whether they are the same. For example, if the three amounts are the same, there is no discrepancy. If the amounts are not the same, the verification system 430 will identify a discrepancy on the associated node(s).

In step 670, the verification system 430 will mark the nodes based on the comparison made in step 660. For example, if the three amounts are the same, a node will be marked as acceptable (e.g., no discrepancy is present). If the amounts are not the same, the verification system 430 will create an alert to flag the associated node as being related to a discrepancy. This may occur, for example, when the fulfilled order size or original order size does not match the actual fulfilled order size.

Through process 600, the verification system 430 performs a back-propagation analysis to determine whether the events within the visualization are verified such that the tree structure can be relied on for regulatory reporting. If the calculated amounts do not match at any node, the verification system 430 can deduce that the visualization includes a discrepancy and it should not be reported as compiled.

In an embodiment, the verification process 600 may further include an additional step 665, in which a machine learning model determines that the identified discrepancy is a valid discrepancy or false positive. The false positives incorrectly indicate the presence of discrepancies when discrepancies are not actually present.

In an embodiment, referring to FIG. 4, the verification system 430 can include a trained machine learning model 432. The machine learning model 432 can be trained to determine that the one or more identified discrepancies are valid discrepancies (i.e., discrepancies are actually present) or false positives.

In a first embodiment, the machine learning model 432 can be trained by: (1) meta data of a source system, including but not limited to: a name of the source system (e.g., sales system 310, manual order system 330, etc.), a type of the source system (e.g., manual system, automated system, or algorithmic system), an average order size and the maximum order size for a particular ticker, operating exchange, day of the order execution (e.g., Monday, Tuesday, etc.), the original order size, the modified order size, the cancelled order size, the fulfilled order size, etc.; (2) meta data of a receiving system, including but not limited to: name of the receiving system, type of the receiving system (e.g., manual system, automated system, or algorithmic system); (3) identified discrepancies by the verification system 430; (4) ground truth data (labeled discrepancies).

Machine learning experts (e.g., subject matter experts) can evaluate and label whether the identified discrepancies are valid errors or false positives. The labeled discrepancies can be used as ground truth data to train the machine learning model. The trained machine learning model can predict whether a particular discrepancy arises between a pair of sub systems in the trade system 110 (i.e., between a source system and a receiving system) is a valid discrepancy or a false positive.

In the first embodiment, the machine learning model 432 can be a binary classifier. In another example, the machine learning model can be a logistic regression model, a decision tree model, or a random forest model.

In the first embodiment, the machine learning model 432 learns how to determine whether a discrepancy that arises between two sub systems in the trade system 110 is valid or not. The machine learning model 432 is trained by the source order system, the receiving order system, the order size (i.e., the quantity of an order), the ticker, the exchange where the order is fulfilled, and the number of days between fulfill date and the original order date. For example, different trade systems 101 may take different days to fulfill. The number of days between fulfill date and the original order date may also depend on the exchange where the orders are executed, different order sizes, different tickers which represent the demand/supply of the ticker orders in the exchange. For example, if an exchange takes typically 2-3 days to fulfill an order size over 100,000 for a particular ticker in the historical data used for training the machine learning model 432, then the trained machine learning model 432 will wait for 2-3 days before raising an alert of discrepancy.

In a second embodiment, the machine learning model 432 can be trained in a different way. The machine learning model 432 can be trained by: (1) a tree structure having nodes (objects) and links (relation) and its meta data (the original order size, the fulfilled order size, the actual fulfilled order size); (2) discrepancies identified from the tree structure; (3) ground truth data (labeled discrepancies). The trained machine learning model 432 can predict whether a particular discrepancy for the order is a valid error or a false positive.

In the second embodiment, the machine learning model 432 can be a graph based neural network model, e.g., a graph convolutional neural network (GCNN) model. The GCNN model can be trained to score the discrepancies. The training data is encoded as a matrix, which is input to the GCNN for training. The score range is [0, 1], score "0" indicates a false discrepancy, while score "1" indicates a true discrepancy.

In the second embodiment, one or more discrepancies identified from a tree structure are inputted into the trained machine learning model 432, and the trained machine learning model 432 can predict that one or more discrepancies are valid discrepancies or false positives at overall order fulfillment. The machine learning model in the first embodiment is trained for a discrepancy between two sub-systems (source system and receiving system) in the trade system 110, while the machine learning model in the first embodiment is trained for one or more discrepancies at an overall order fulfillment (the whole tree structure).

Figure 7:
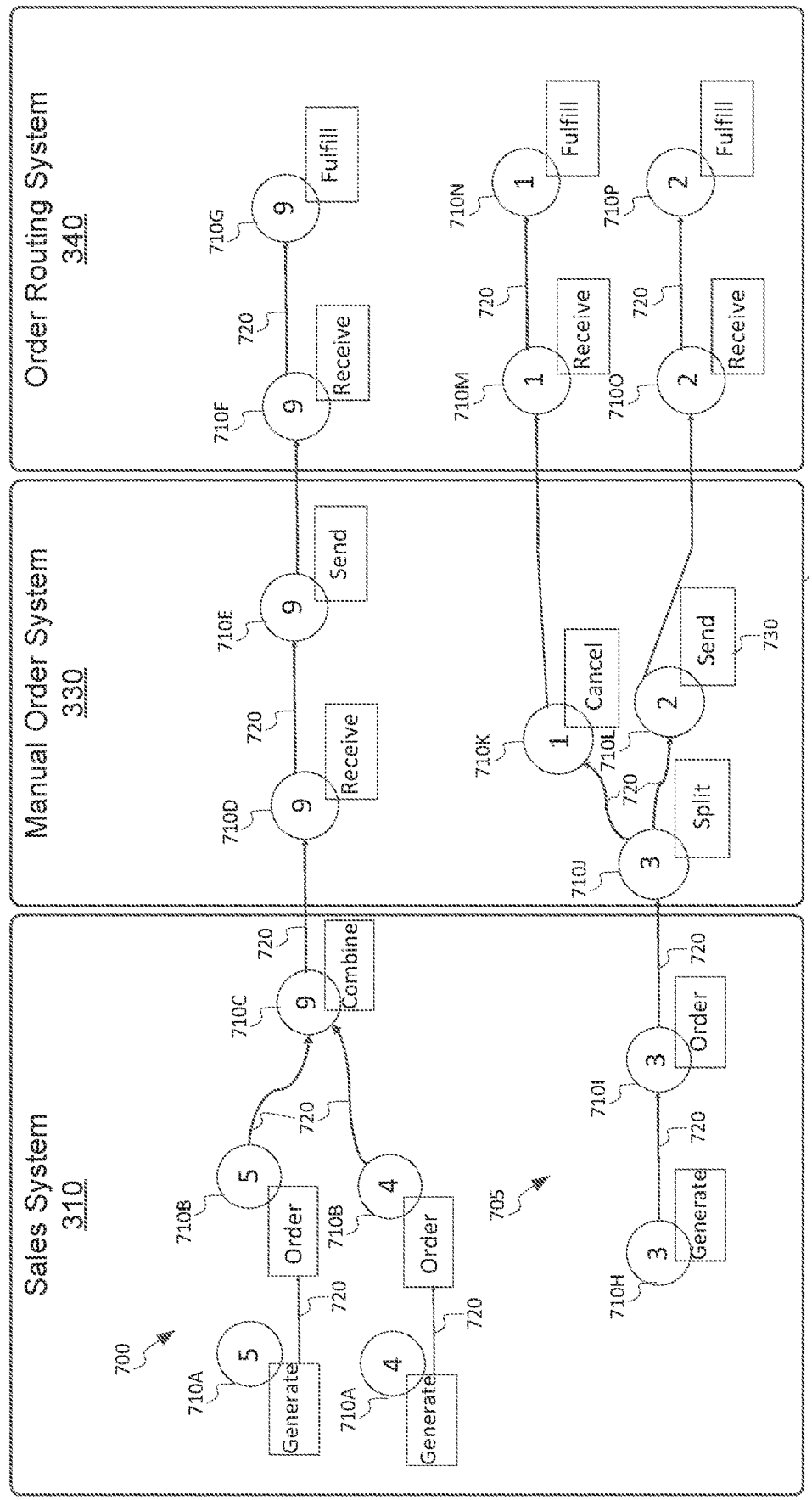
FIG. 7 is a diagram of an exemplary tree structure visualization of a trade order life cycle.

FIG. 7 illustrates an example of a first tree structure 700 and a second tree structure 705 that the monitoring system 120 may produce as a visualization of a first trade order life cycle and a second trade order life cycle, respectively. The tree structure 700 includes a plurality of nodes 710 connected by a plurality of links 720. Each node 710 represents an event that occurs during the life cycle of a trade order. For example, each node 710 may represent an event such as generation of an order, sending of an order to another system, receipt of an order from another system, splitting of an order, combining of an order, cancelation of an order, fulfillment of an order, or a combination of one or more of these events. Another event that may be tracked as part of the tree structure may be an order modification, such as a change in quantity, price, etc. The monitoring system 120 may receive information about the overall trade order from the trade system 110 (e.g., via system connections, order management systems, etc.) and produce the tree structures 700, 705 as a visualization of the trade orders.

As shown in FIG. 7, the exemplary first tree structure 700 representing the first trade order may start in the sales system 310 as a plurality of nodes 710A, consisting of data indicating an amount for trade (shown in the figure as numerals 5, 4). These nodes 710A are linked to a next level of nodes 710B. In an exemplary embodiment, the orders originating at 710A may be combined in an event that is visualized as node 710C. The node 710C may additionally or alternatively represent an order event that prepares the combined order to be sent across systems to the manual order system 330. The monitoring system 120 tracks the order across systems (e.g., by receiving data from both systems) and creates nodes 710D as a receipt node at the manual order system 330. The monitoring system 120 may track the order within the manual order system 330 and create node 710E, representing that that the order is being prepared to be sent to the order routing system 340. The order routing system 340 may receive the combined order at node 710F and may facilitate fulfillment of the order at node 710G.

The exemplary second tree structure 705 representing the second trade order may similarly start in the sales system 310 as an initial order node 710H that is prepared to be sent to the manual order system 330 at a node 710I. The manual order system 330 may receive the order at the node 710J. In an exemplary embodiment, the order is split into two child nodes in the manual order system 330, represented at node 710K and node 710L. The child order at node 710K is cancelled, but is still sent to the order routing system 340, where it is received at node 710M and fulfilled at node 710N. The child order at node 710L is not cancelled, and is also sent to the order routing system 340, where it is received at node 710O and fulfilled at node 710P.

The tree structures 700, 705 are thus visualizations of various different events throughout the life cycle of a first and second trade order. The nodes 710 and linkages 720 represent the path of different portions of the trade across multiple systems (e.g., systems 310-350). It should be understood that the tree structure 700, nodes 710, and linkages 720 are merely examples and that other scenarios and situations are possible.

The monitoring system 120 may be configured to provide the nodes 710 and linkages 720 to a visualization space within a computing device (e.g., a processing device in a client device) in order to allow the computing device to display the visualization. Moreover, the monitoring system 120 (e.g., via the verification system 430) may back-propagate the process 600 to review the tree structures 700, 705 to determine whether the visualizations are missing information or include incorrect information.

Each tree structure 700, 705 may be subject to the process 600 in order to allow the monitoring system 120 to identify any potential discrepancies. For example, the verification system 430 may calculate an original order size, a fulfilled order size, and an actual fulfilled order size for each of the nodes 710A-710G. In the example of FIG. 7, the tree structure 700 represents a trade order in which two initial orders in an amount of five (5) and (4) were generated and a final order in an amount of nine (9) was fulfilled and acknowledged. Thus, at each node 710A-710G, the original order size, fulfilled order size, and actual fulfilled order size will be equal to nine (9), and thus, no discrepancies will be flagged. The tree structure 700 may then be marked as acceptable for reporting.

The tree structure 705, on the other hand, may include a discrepancy due to the child order at node 710K that was cancelled, if, for example, the cancellation is not identified in the data and the execution reports still report this portion of the order as being fulfilled. In this scenario, the original order size will be three (3) (based on the original order sizes and the data about the cancellation being missing), the fulfilled order size will also be three (3) (based on the execution reports), but the actual fulfilled order size will only be two (2) (due to only order at leaf node 710P being acknowledged as actually fulfilled). The monitoring system 120 may therefore identify a discrepancy at nodes 710H, 710I, 710J, 710K, 710M, and 710N, indicating that the tree structure 705 is not satisfactory for reporting. Manual or automated review may follow in order to identify that cancelation data is missing. The data may be added and the process 600 repeated. With the complete data, the monitoring system 120 may calculate the original order size to be two (2), taking into account the cancelation. The fulfilled order size may also be calculated to be two based on the execution reports. Accordingly, the adjusted tree structure may be marked as satisfactory for reporting.

FIGS. 8-11 illustrate another exemplary tree structure 800. The tree structure 800 includes nodes 1000, 1001, 1002, 1003, 1004, 1005, 1006, 1007, and 1008. These nodes may span across different systems, such as systems 310-350 described above. The node 1000 may be an initial order node and include an amount of an order, such as an amount of one hundred (100). The initial order may be split at node 1002 into nodes 1003, 1004, 1005. The child orders may be fulfilled at nodes 1006, 1007, 1008, respectively. The process 600 may be applied to the tree structure 800 to identify discrepancies in the visualization. For example, the verification system 430 may calculate the original order size ("O") based on the data associated with the initial order node 1000 and the fulfilled order size ("F") based on a sum of the execution reports (e.g., the execution reports at nodes 1006, 1007, 1008 may provide individual amounts of 20, 40, 40 respectively). In the illustrated example, these totals may both equal one hundred (100). The verification system 430 may next perform the back-propagation process to calculate the value of the actual fulfilled order size ("T") for each node.

Figure 8:
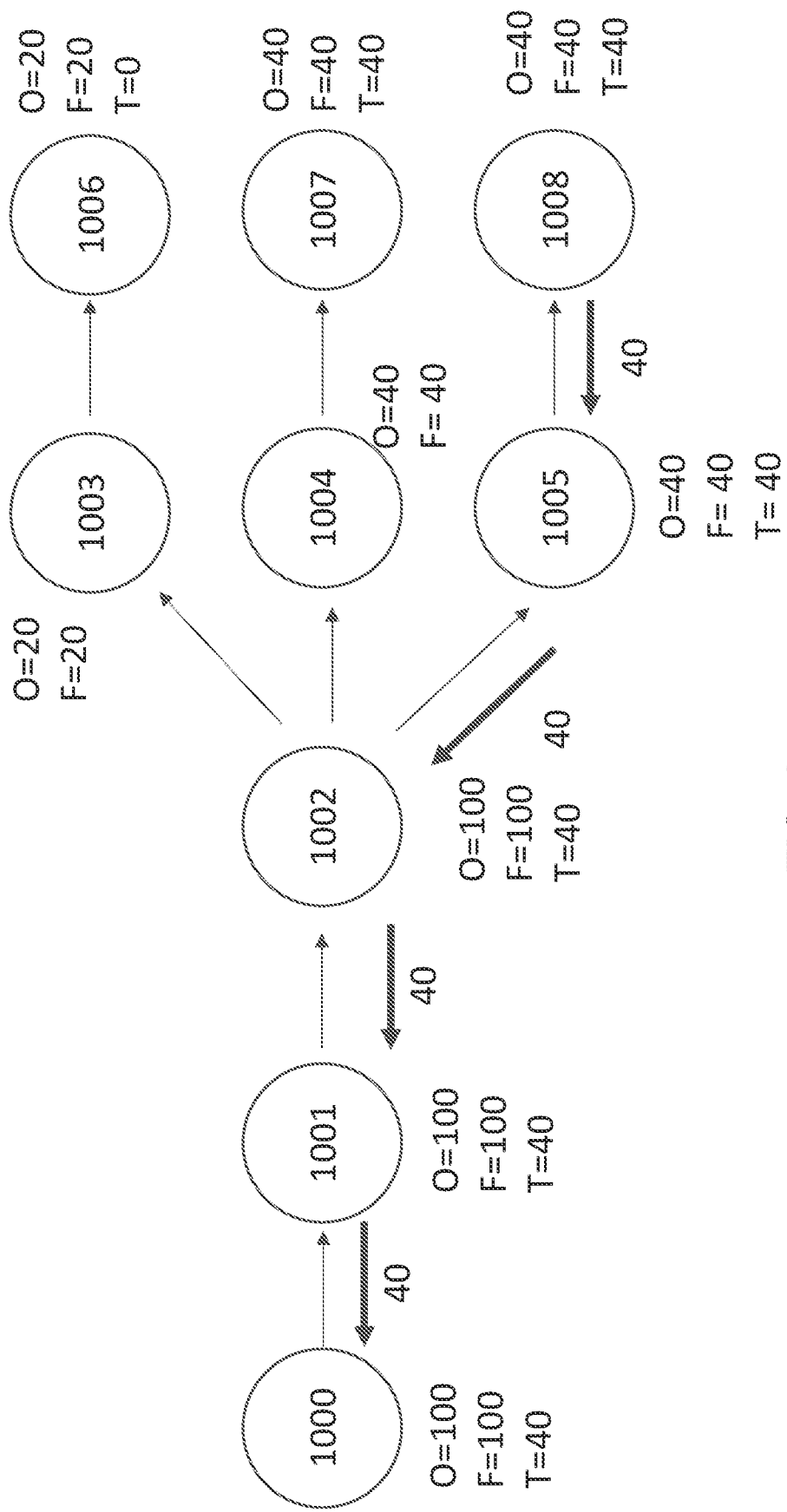
FIG. 8 is a diagram of another exemplary tree structure of a trade order life cycle, further illustrating the back-propagation process.

In FIG. 8, the verification system 430 starts with leaf node 1008 and determines that an amount of forty (40) has been acknowledged as actually fulfilled (T=40). The verification system 430 sends this amount (40) back through nodes 1005, 1002, 1001, and 1000.

Figure 9:
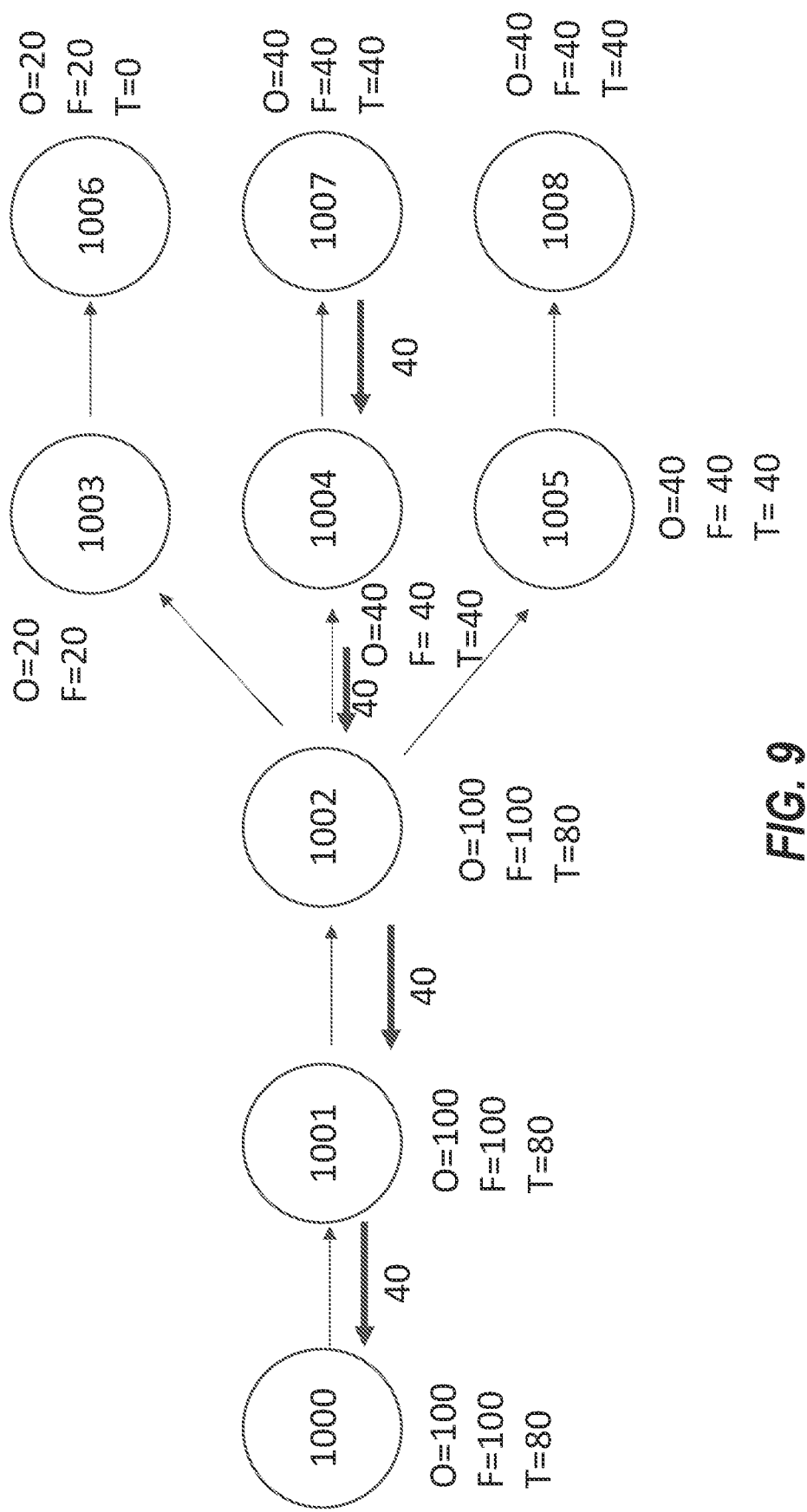
FIG. 9 is a diagram of the tree structure of FIG. 8, further illustrating the back-propagation process at a second leaf node.

In FIG. 9, the verification system 430 moves to leaf node 1007 and determines that another amount of forty (40) has been acknowledged as actually fulfilled (T=40). The verification system 430 sends this amount (40) back through nodes 1004, 1002, 1001, and 100. The actual fulfilled order size at nodes 1000, 1001, and 1002 is updated to add forty (40) to the previous amount of forty (40) from the back-propagation of leaf node 1008. Thus, T=80 for nodes 1000, 1001, and 1002 after the back-propagation of leaf node 1007.

Figure 10:
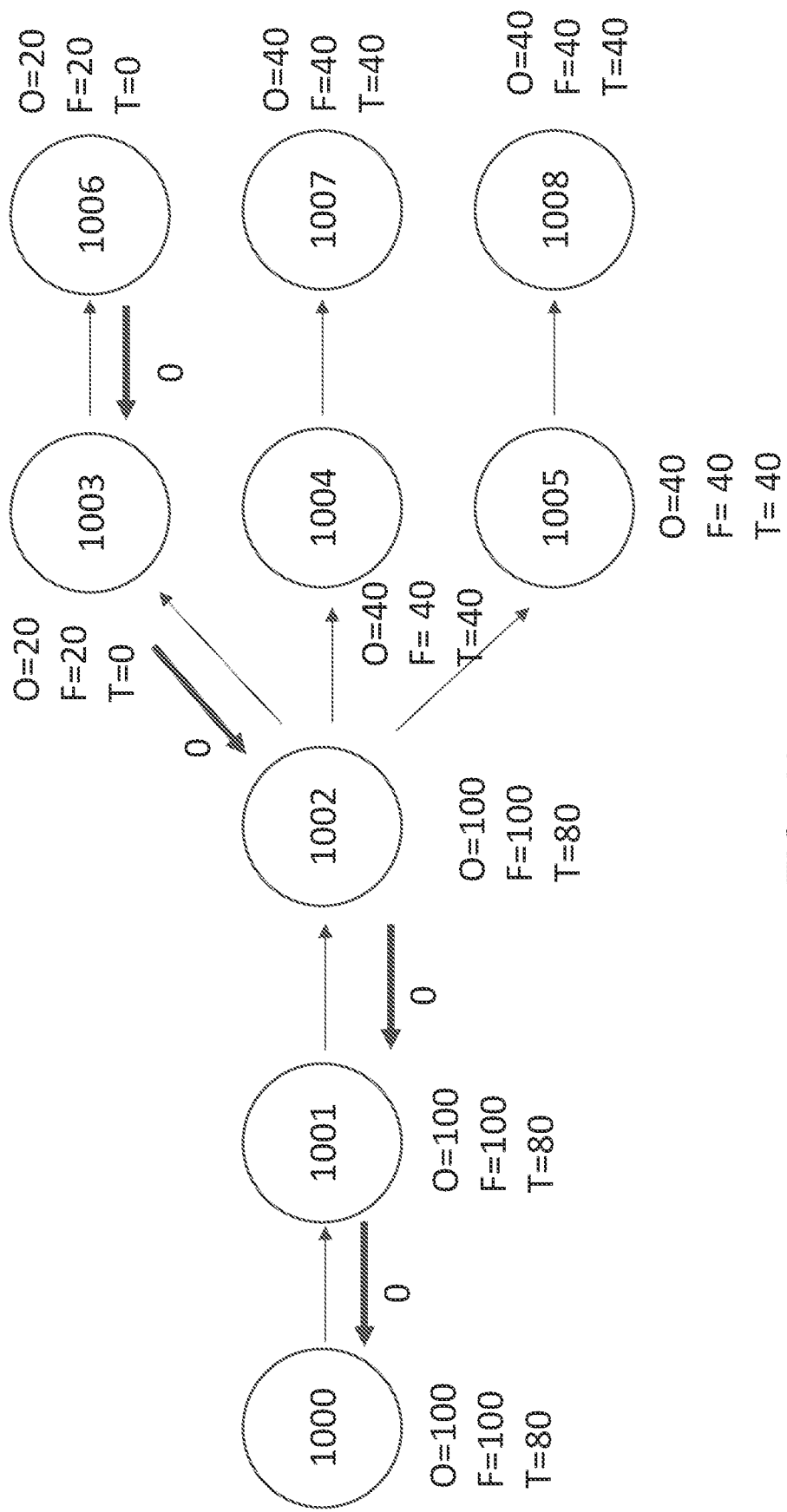
FIG. 10 is a diagram of the tree structure of FIG. 8, further illustrating the back-propagation process at a third leaf node.

In FIG. 10, the verification system 430 moves to leaf node 1006 and determines that no amount has been acknowledged as actually fulfilled (T=0). The verification system 430 sends this amount (0) back through nodes 1003, 1002, 1001, and 1000. The actual fulfilled order size at nodes 1000, 1001, and 1002 thus remain at eighty (80). There being no additional leaf nodes, the back-propagation process is complete.

The verification subsequently compares the values O, F, and T at each node to determine whether they are the same. As shown in FIG. 10, the nodes 1004, 1005, 1007, and 1008 have values O, F, and T that respectively match for each node. Nodes 1000, 1001, 1002, 1003, and 1006, on the other hand, include values for T that are different than the respective values for O and F. Thus, a discrepancy exists. For example, there may be a discrepancy due to node 1006 missing acknowledgment information that indicates that the order amount of twenty (20) was actually fulfilled.

Figure 11:
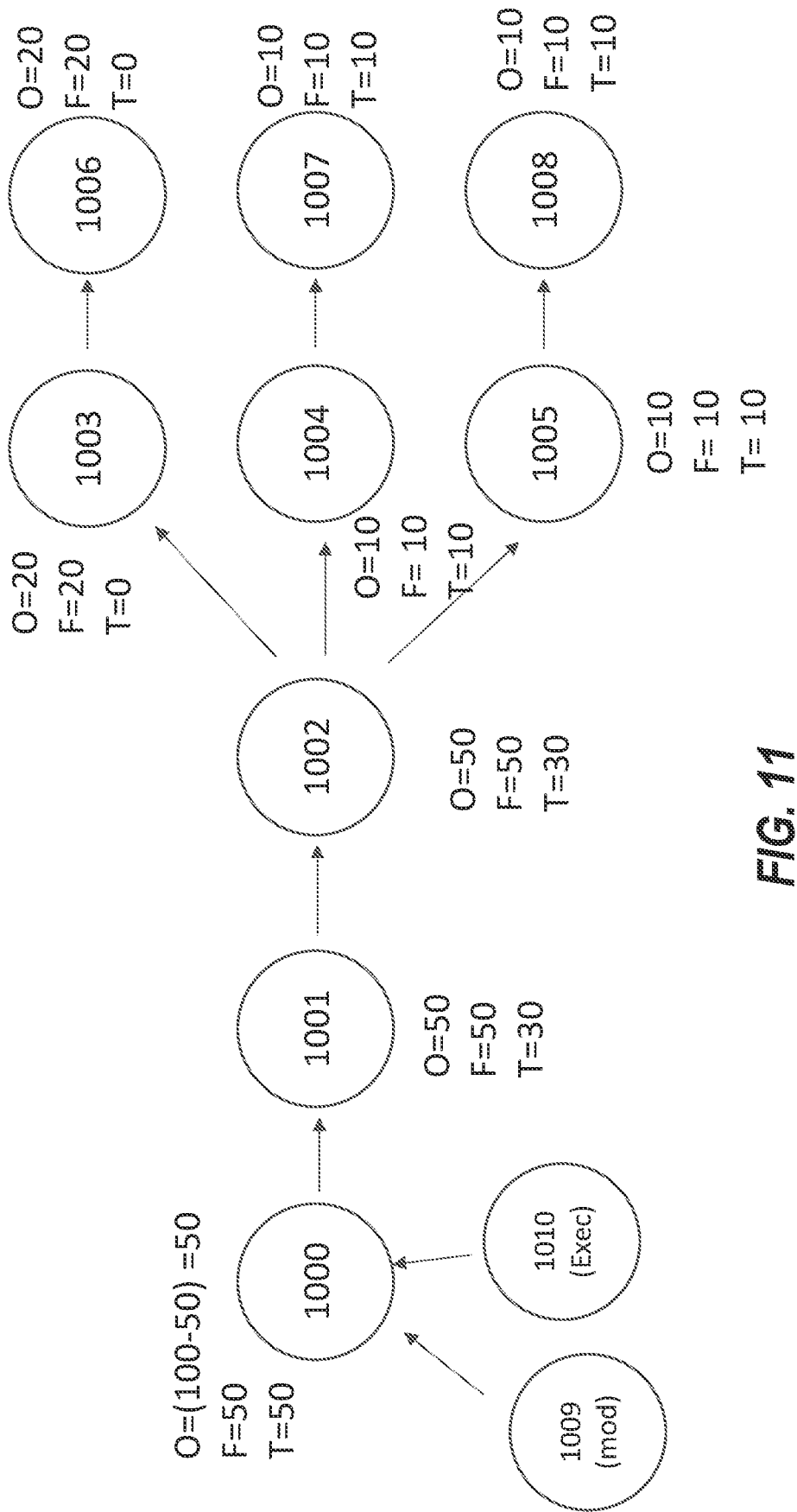
FIG. 11 is a diagram of the tree structure of FIG. 8, illustrating the effect of a modification node.

FIG. 11 illustrates a modified tree structure 800A that is similar to the tree structure 800, but further includes a modification node 1009 linked to the initial order node 1000. The modification node 1009 may represent an event in which the original amount of one hundred (100) is modified to be only fifty (50). As a result, the original order size may be fifty (O=50). FIG. 11 also illustrates that an execution report 1010 may be represented as linked to the initial order node 1000. The execution report 1010 may indicate the amount that was expected to be fulfilled when the order was sent to node 1001 (e.g., F=50).

The disclosed embodiments describe systems and methods that may be implemented in association with a trade system to receive data related to a trade order, produce a visualization of the trade order, review the trade order for issues, and prepare the visualization and/or data associated with the trade order for reporting. It should be understood that the disclosed examples are not an exhaustive list of all events that may occur during the life cycle of a trade order. Further, the discrepancies that may occur as a result of data collection and/or creation of the visualization are not limited to those described herein.

The present description and claims may make use of the terms "a," "at least one of," and "one or more of," with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples are intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the example provided herein without departing from the spirit and scope of the present invention.

The system and processes of the Figures are not exclusive. Other systems, processes and menus may be derived in accordance with the principles of embodiments described herein to accomplish the same objectives. It is to be understood that the embodiments and variations shown and described herein are for illustration purposes only. Modifications to the current design may be implemented by those skilled in the art, without departing from the scope of the embodiments. As described herein, the various systems, subsystems, agents, managers, and processes can be implemented using hardware components, software components, and/or combinations thereof. No claim element herein is to be construed under the provisions of 35 USC 112, sixth paragraph, unless the element is expressly recited using the phrase "means for."

Although the invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

What is claimed is:

1. A computer-implemented method for verifying a visualization of a trade order life cycle in a data processing system comprising a processor and a memory comprising instructions which are executed by the processor, the method comprising:

receiving information associated with a plurality of events associated with the trade order;

generating a plurality of nodes based on the received information and storing identifiers associated with each of the plurality of nodes;

linking the plurality of nodes based on the identifiers to create a tree structure as the visualization of the trade order life cycle;

performing a verification process to identify a discrepancy if the tree structure is missing information or includes incorrect information;

determining, by a trained machine learning model, that the discrepancy is a valid discrepancy or a false positive, wherein the trained machine learning model is trained by meta data of a source system, meta data of a receiving system, identified discrepancies, and ground truth data; and flagging the valid discrepancy on the tree structure.

2. The method of claim 1, wherein the meta data of a source system includes a name of the source system, a type of the source system, an average order size and a maximum order size for a particular ticker, an operating exchange, day of the order execution, an original order size, a modified order size, a cancelled order size, and a fulfilled order size.

3. The method of claim 1, wherein generating a plurality of nodes comprises partitioning the received information by ticker and identifying root orders within the partitioned received information.

4. The method of claim 1, wherein linking the plurality of nodes comprises storing a type of linkage based on the identifiers associated with the plurality of linked nodes.

5. The method of claim 1, wherein the identifiers indicate the system associated with the event, wherein linking the plurality of nodes includes linking at least some nodes across systems.

6. The method of claim 1, wherein the identifiers include an amount identifier associated with the node and wherein the verification process includes calculation of a plurality of order amounts for each node and comparing the plurality of order amounts to determine whether the visualization is missing information or includes incorrect information.

7. The method of claim 6, wherein the plurality of order amounts include an original order size, a fulfilled order size, and an actual fulfilled order amount, wherein the original order size is a total amount initially ordered revised based on any order modifications or cancelations, wherein the fulfilled order size is a total amount that is expected to be fulfilled as part of the trade order based on execution reports, and wherein the actual fulfilled order size is a total amount acknowledged as actually being fulfilled, back-propagated from each leaf node.

8. The method of claim 7, wherein performing a verification process to identify a discrepancy comprises determining that a discrepancy exists at a node when the actual fulfilled order size is not the same as the original order size or the fulfilled order size at that node.

9. A computer-implemented method for verifying a visualization of a trade order life cycle in a data processing system comprising a processor and a memory comprising instructions which are executed by the processor, the method comprising:

receiving information associated with a plurality of events associated with the trade order;

generating a plurality of nodes based on the received information and storing identifiers associated with each of the plurality of nodes;

linking the plurality of nodes based on the identifiers to create a tree structure as the visualization of the trade order life cycle;

performing a verification process to identify a discrepancy if the tree structure is missing information or includes incorrect information;

determining, by a trained machine learning model, that the discrepancy is a valid discrepancy or a false positive; and flagging the valid discrepancy on the tree structure, wherein the trained machine learning model is trained by the plurality of nodes and linkages linking the plurality of nodes, meta data of the tree structure including an original order size, a fulfilled order size, an actual fulfilled order size, discrepancies identified from the tree structure, and ground truth data.

10. A monitoring system for detecting a discrepancy in a trade order life cycle, the monitoring system comprising a processing device and a memory storing instructions, wherein the processing device is configured to execute the instructions to:

create a visualization of the trade order life cycle, the visualization comprising:

a plurality of nodes created based on events associated with the trade order, the plurality of nodes including identifiers associated therewith; and a plurality of linkages determined based on the identifiers, the linkages creating a tree structure of the visualization;

perform a verification process to identify a discrepancy if the tree structure is missing information or includes incorrect information;

determine, by a trained machine learning model, that the discrepancy is a valid discrepancy or a false positive, wherein the trained machine learning model is trained by the plurality of nodes and linkages linking the plurality of nodes, meta data of the tree structure including an original order size, a fulfilled order size, an actual fulfilled order size, discrepancies identified from the tree structure, and ground truth data; and modify the tree structure to indicate the missing information or the incorrect information as a valid discrepancy at a node associated with the valid discrepancy.

11. The monitoring system of claim 10, wherein the visualization includes at least some nodes linked across two or more of a sales system, an algorithmic system, a manual order system, an order routing system, and a market system.

12. The monitoring system of claim 10, wherein the visualization includes at least some nodes linked as a result of a parent order split into two or more child orders.

13. The monitoring system of claim 10, wherein the visualization includes at least some nodes linked as a result of messages being sent within the same system, wherein the same system is sales system, an algorithmic system, a manual order system, an order routing system, or a market system.

14. The monitoring system of claim 10, wherein the verification process includes calculation of a plurality of order amounts for each node and comparing the plurality of order amounts to determine whether the visualization is missing information or includes incorrect information.

15. The monitoring system of claim 14, wherein the plurality of order amounts include an original order size, a fulfilled order size, and an actual fulfilled order amount, wherein the original order size is a total amount initially ordered revised based on any order modifications or cancellations, wherein the fulfilled order size is a total amount that is expected to be fulfilled as part of the trade order based on execution reports, and wherein the actual fulfilled order size is a total amount acknowledged as actually being fulfilled, back-propagated from each leaf node.

16. The monitoring system of claim 15, wherein the tree structure is modified based on a discrepancy that exists at a node when the actual fulfilled order size is not the same as the original order size or the fulfilled order size at that node.

17. A computer-implemented method for verifying a visualization of a trade order life cycle, in a data processing system comprising a processor and a memory comprising instructions which are executed by the processor, the method comprising:

calculating a plurality of order amounts at a plurality of nodes of a tree structure of the visualization, comprising:

computing an original order size for each node,
computing a fulfilled order size for each node, and
computing an actual fulfilled order size for each node;

comparing the plurality of order amounts at the plurality of nodes to identify a discrepancy when the plurality of order amounts do not match, the discrepancy being associated with one or more node(s) at which the plurality of order amounts do not match;

determining, by a trained machine learning model, that the identified discrepancy is a valid discrepancy or a false positive, wherein the trained machine learning model is trained by meta data of a source system, meta data of a receiving system, identified discrepancies, and ground truth data; and flagging the valid discrepancy on the tree structure.

18. The method of claim 17, computing the actual fulfilled order size, comprises:

selecting a leaf node;
determining an amount acknowledged as actually fulfilled at the leaf node;
sending the amount back to previously linked nodes; and
repeating the determining and sending steps for each leaf node in the visualization.

\* \* \* \* \*